United States Patent Office 3,119,771
Patented Jan. 28, 1964

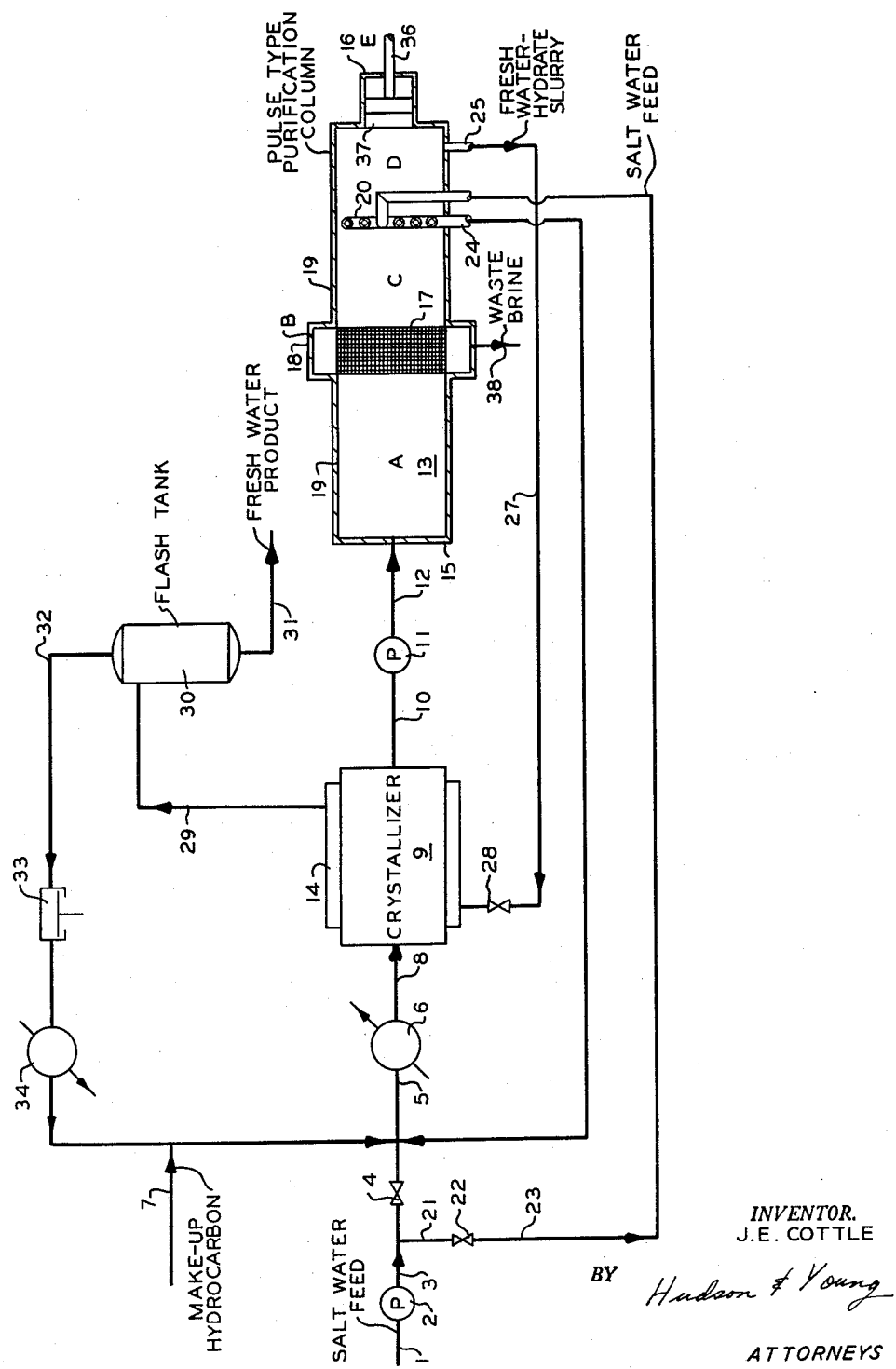

3,119,771
DESALTING AQUEOUS SALT SOLUTIONS BY THE FORMATION OF HYDROCARBON HYDRATES AND THE PURIFICATION THEREOF
John E. Cottle, Bartlesville, Okla., assignor to Phillips Petroleum Company, a corporation of Delaware
Filed July 27, 1960, Ser. No. 45,715
8 Claims. (Cl. 210—59)

This invention relates to the production of substantially salt-free water from aqueous salt solutions. In one aspect, it relates to the removal of substantially salt-free water from sea water by the formation of hydrates of hydrocarbons and the subsequent purification of these hydrates.

Because of the substantially constant volume of readily available fresh water and the almost geometric increase in population accompanied by increasing industrial and agricultural demands placed upon fresh water much effort is being expended to develop methods of providing a supplementary source of fresh water by desalting sea water. Suggested methods include solar evaporation, electrodialysis, distillation processes, freezing processes, chemical reactions, etc. A vital factor limiting the possible success of many of the proposed methods is the large energy requirement.

The present invention resides in a method for producing fresh water from sea water, brackish water or other aqueous salt solutions. It is well known in the art that certain hydrocarbons will combine with water to form compositions commonly called hydrocarbon hydrates. Methods have been proposed for contacting a stream of aqueous saline solution with a hydrate-forming substance under hydrate-forming conditions of temperature and pressure, separating the hydrate from the mother liquor and subsequently decomposing the hydrate to produce a relatively salt-free water. However, methods thus far proposed have proven to have limitations due to the impurities entrapped or adsorbed on the hydrate crystals and the relatively expensive methods available for purification of these crystals so as to produce a substantially salt-free fresh water.

In the patent of Rosswell W. Thomas, Patent No. 2,854,494, issued September 30, 1958, process and apparatus are disclosed for the purification of a confined mass of crystals in a process wherein said crystals are supplied continuously to a purification zone and said crystals are therein intermittently and simultaneously contacted with a flow of reflux liquid countercurrent to the flow of crystals.

The present invention provides a process for effecting the hydration of light hydrocarbons by means of aqueous salt solutions and the purification and decomposition of said hydrates to form substantially salt-free fresh water over long periods of operation with ease of operation, improved heat distribution and high throughput rates thereby contributing substantially to the art of desalting aqueous salt solutions.

An object of this invention is to provide a method for producing fresh water from aqueous salt solutions. Another object of this invention is to provide a method for the purification of hydrocarbon hydrates. Still another object of this invention is to provide a method for the production of substantially salt-free water from hydrocarbon hydrates formed by the contacting of hydrocarbons with aqueous salt solutions under hydrate-forming conditions. Yet another object of this invention is to provide a method of purifying and decomposing hydrocarbon hydrates formed by the contacting of hydrocarbon with aqueous salt solutions under hydrating conditions to yield a substantially salt-free water.

These and other objects and advantages of this invention will become more readily apparent from the following detailed description and discussion.

The objects of this invention are broadly accomplished by the contacting of a hydrate-forming material with an aqueous salt solution in a hydrate-forming zone under conditions suitable for the formation of hydrates, removing said hydrates to a purification zone, removing mother liquor from said hydrate, melting a portion of said hydrates within said purification zone, removing a slurry of pure water and hydrate and forcing the remainder of said slurry countercurrent to the flow of the hydrates by directly applying a pulsating pressure substantially only against said slurry to establish a pulsating intermittent reflux stream within said purification zone, thereby removing the impurities from the hydrates.

In one aspect of the invention substantially salt-free water is removed from the melting area in the substantial absence of hydrate crystals.

The term "melt," as used herein, means decomposition of the hydrocarbon-water molecule by application of heat or reduction in pressure.

It has been suggested that the formation of hydrocarbon hydrates by the contacting of hydrocarbons with aqueous salt solutions may be represented by the following equation when using propane as the representative hydrocarbon:

$$\text{Aq. NaCl} + \text{C}_3\text{H}_8 + 18\text{H}_2\text{O} \rightleftharpoons \text{Aq. NaCl} + \text{C}_3\text{H}_8 \cdot 18\text{H}_2\text{O}$$

The temperature and pressure at which this reaction will proceed from left to right will depend on the hydrocarbon being used. For instance, when the hydrocarbon is propane, the reaction will progress from left to right at a temperature of 30 to 43° F. at a pressure of 15 to 400 p.s.i.a. By the method of the instant invention the decomposition of the resultant propane hydrate may be accomplished merely by the regulation of pressure, thereby making it possible to maintain a substantially constant temperature throughout the operation. However, it is within the scope of the invention to decompose the hydrate by the regulation of either temperature or pressure or both. When using a mixture of hydrocarbons, it is possible to form hydrates at higher pressures and at temperatures more nearly approaching ambient temperature than when using propane alone. For instance, when using mixtures of propane with up to 25 mole percent ethane the temperature at which the hydrocarbon hydrate crystals are formed is a maximum of about 55° F. at a pressure of 400 p.s.i.a. Preferably from 5 to 15 mole percent ethane is used with the propane. When using a mixture of hydrocarbons, such as propane and ethane or propane and methane, it is of course desirable to maintain the hydrocarbon compositions such that the greatest possible yield of fresh water can be produced taking into consideration the desired operating temperature, i.e., the temperature of hydrate formation. Since propane hydrate contains more water than methane hydrate or ethane hydrate, the proportion of lighter component or components is preferably held to a minimum. One advantage of using hydrocarbon mixtures is that it is possible to eliminate expensive refrigeration.

The process described herein utilizes a hydrate forming substance such as propane entirely in the gaseous stage but it is within the scope of the invention to utilize a liquid-gas mixture or a liquid. Many common gases, gas mixtures and gas-liquid combinations with an ability to form hydrates can be used. Preferred hydrate-forming substances are paraffin hydrocarbons having from one to four carbon atoms per molecule. Suitable hydrate forming substances include methane, ethane, propane, n-butane, isobutane, ethylene and its homologues and acetylene and its homologues. Preferred hydrate forming gases are methane, ethane and propane which are relatively cheap, noncorrosive, reasonably safe and form hydrates with relatively low energy demand whether in the gaseous or liquefied form.

The temperature and pressure for the hydrate forming zone will depend upon the hydrate forming substance chosen. In general, pressures suitable for use with the preferred hydrate forming substances range from about 10 to 5,000 p.s.i.g. and preferably 100 to 1,000 p.s.i.g. with suitable temperatures ranging from about 32 to 100° F. and preferably from 40 to 75° F. depending on the pressure chosen. It is preferred to use a temperature as close to the ambient temperature as possible so that the temperature of the available saline water will not have to be materially changed. The pressure within the hydrate forming zone and the purification zone will be substantially identical although it is within the scope of the invention to lower the pressure and/or increase the temperature in the purification zone to assist in the decomposition of the hydrate.

The ratio of the hydrate-former, such as propane, to the aqueous salt solution in the feed will depend on the nature of the hydrate former and the operating conditions but in general the ratio of hydrate forming material to water should be smaller than needed for the conversion of all the water into hydrate. The minimum amount of hydrate-former should be greater than the amount soluble under the conditions prevailing in the hydrate formation zone since only then is formation of solid hydrate possible. In general, the ratio should be such that at least 5 percent and less than 90 weight percent, preferably 10 to 80 weight percent, of the water fed is converted in the hydrate.

Subsequent to the formation of the hydrate, the hydrates must be separated from the mother liquor and then decomposed and the water separated from the hydrate forming substance. Heretofore, it has been found that the hydrate crystals are relatively impure and contain significant quantities of impurities such as salt which are undesirable in most applications of fresh water and which have heretofore been most expensive to remove. The combination of process steps herein described for the production of fresh water from salt water possesses many advantages including power requirements less than other known processes and the operation of the system at a temperature substantially that of the incoming salt water, thereby reducing investment in heat transfer surfaces and utilities and reducing the corrosion normally inherent in system utilizing higher temperatures.

Subsequent to the formation of the hydrates, said hydrates, which are normally crystals, are conveyed to a purification zone operated at substantially the same pressure as that in the hydrate forming zone. The mass of crystals to be purified are passed through a section within said purification zone containing a filter which is integral with the wall of said section and positioned at an intermediate part thereof, then through a reflux section toward a heating means positioned near the exit end of the purification zone, which heating means melt those hydrate crystals which arrive in the vicinity thereof. The melt is withdrawn in part as a slurry of fresh water and hydrate crystals, or as a substantially hydrate-free fresh water product, from the exit end and forced in part back to the reflux zone toward the filter by means of a pulsating back pressure applied to the contents of the purification chamber. One means of applying this pulsating back pressure is a reciprocating piston positioned in a cylinder which is in open communication with said zone at the end of which said heating means is positioned. Thus, when the hydrate crystals are supplied steadily during a given period of time to the purification zone, the reflux liquid is moved intermittently in the opposite direction, that is countercurrently with respect to the hydrate crystals.

It has been theorized that as the melted crystal product contacts the impure hydrate crystals said impure crystals melt thereby taking their energy from the pure water which then refreezes as pure hydrate crystals. As the impure hydrate crystals melt, salt trapped in the interstitial spaces of the crystal is released. However, this invention is not to be limited by any theory of operation.

It is often desirable to control the ratio of hydrate crystals to mother liquor in the feed introduced into the purification column so that the mixture will be pumpable but still have sufficient solids present to have some compressibility so as to prevent a water hammer effect sometimes produced by the action of the pulsating back pressure. The optimum ratio of solids to liquid will depend on the particular materials to be separated, crystal size, and other factors readily determined by routine tests. As a general rule, the solids content of the mixture fed from the hydrate forming zone into the purification zone is within the range 20 to 36 weight percent and preferably 25 to 30 weight percent although a solids content outside the stated ranges can be used.

In one preferred embodiment of the invention, sea water is introduced at ambient temperature into a crystallizer along with gaseous propane containing from 5 to 25 weight percent gaseous ethane with the crystallizer operating under conditions of temperature and pressure suitable for the formation of hydrate crystals, said temperature being in the range of 40 to 55° F. and said pressure being in the range of 375 to 425 p.s.i.g. with the resultant crystals being conveyed continuously from said crystallizer or hydrate forming zone into a pulse type purification column such as disclosed in R. W. Thomas, supra, or a piston type, maintained at substantially the same conditions of temperature and pressure as the hydrate forming zone. The slurry of hydrate crystals and fresh water removed from the purification column as product is then passed through a letdown valve to reduce the pressure so as to insure complete decomposition of the hydrate crystals and then passed to a separate means for the separation of the hydrocarbon from the fresh water product. The hydrocarbon so separated may then be recompressed, condensed and returned to the inlet to the hydrate forming zone. The mother liquor separated from the hydrate crystals within the purification column is ordinarily discarded after making suitable use of its available energies.

The drawing illustrates in diagrammatic form an assembly and arrangement of apparatus parts suitable for practicing the method of this invention with the purification column being shown in cross-section so as to better illustrate the method of purifying the hydrate crystals and the separation of the substantially salt-free water.

In the drawing, reference numeral 1 represents a conduit connected to a source, not shown, of sea water properly filtered of nonsoluble objects such as fish, driftwood, etc., which is forced into the system by pump 2 through conduit 3, valve 4 and conduit 5. The hydrate forming substance is introduced into conduit 5 by means of conduit 32 containing recycle material and make-up hydrate forming substance from conduit 7. For the purposes of this description, the hydrate forming substance will be assumed to be a mixture of propane and ethane. The mixture of propane and ethane and sea water is then fed through conduit 5 into a heat exchanger 6 which will adjust the temperature of the mixture to the desired level which in the case of propane-ethane will be less than 55° F. If desired, the energy contained in the waste brine removed from the filter section B of the purification column through conduit 38 may be used as a heat transfer medium through heat exchanger 6 to conserve energy input into the system (now shown). From the heat exchanger 6, the mixture is fed through conduit 8 into crystallizer 9 which may be any type of hydrate-forming apparatus, such as a scraped surface chiller, containing means for conveying the hydrate crystals through the crystallizer and into the conduit 10, pump 11 and conduit 12 and piston purification column 13. Crystallizer 9 may contain any conventional means for maintaining the temperature and pressure at the desired level, which in the case of a mixture of propane-ethane will be about 55° F. and about 400 p.s.i.a., but a convenient form will comprise a jacket 14 through which a heat transfer medium may be conveyed. It may or may not be necessary to have a pump 11 to assist in the conveyance of the hydrate crystals from the hydrate forming zone to the purification zone.

The cross-section of the purification zone shown in the drawing illustrates one type of purification means which may be utilized in this invention wherein pressure pulsations are produced by a reciprocating piston. Other convenient and conventional methods and apparatus may be used to provide the necessary pulsations such as those described in the patent of R. W. Thomas, supra. For purposes of this description, the purification zone is divided into five sections. Section A represents a receiving area; section B represents a filtering area; section C is a reflux area; section D is a melting area; and, section E is a pulsation producing area.

The purification apparatus is closed by means of end members 15 and 16 which can be of any suitable form known in the art. Section A is merely a hollow area preceding the filtration section B for the purpose of receiving the hydrate crystals from conduit 12. Filtration section B comprises a suitable filter medium 17 and an external shell 18, the latter being provided with an outlet pipe 38 for filtrate. Filter medium 17 can be of any desired type known in the art such as a metallic screen or a perforate metal member supporting a filter cloth. In any event, it is desirable that the filter member 17 be positioned integrally with respect to the shell 19. Filtrate produced in the filter zone B comprises a mother liquor which assists in the conveyance of the crystals to the purification zone and is in essence a concentrated salt solution.

The remaining hydrate crystal mass passes through reflux zone C wherein it is countercurrently contacted with liquid reflux produced as subsequently described. Heater 20 may be any conventional means of providing thermal energy to melt the hydrate crystals but a convenient system is an indirect heat exchange with heating fluid passing therethrough. One convenient means utilizes the energy contained in the salt water feed from conduit 1. Valve 4 or valve 22 may be closed to provide the use of either system. If the salt water is fed through conduit 21, valve 22 and conduit 23 into heater 20, the salt water is then removed from heater 20 and returned through conduit 24 into conduit 5.

As the hydrate crystal mass approaches heater 20 in melting section D, the crystals are melted. Part of the melt produced by heater 20 is withdrawn through outlet pipe 25 as a slurry of hydrate crystals and fresh water product. As shown in the drawing, this slurry contains valuable thermal energy represented by the heat of hydration which may be more fully utilized by conveying through conduit 27, pressure letdown valve 28 into jacket 14 of the hydrate forming zone, thence into conduit 29 and into flash tank 30 wherein the hydrocarbon hydrate-forming substance is separated from the purified water by permitting the mixture to flash into a vessel at substantially atmospheric pressure. Certain hydrate forming substances may require a pressure less than atmospheric. The substantially salt-free fresh water product is then removed through conduit 31 while the hydrate forming substance such as the ethane-propane mixture used in this description, is removed through conduit 32, compressor 33, condenser 34 and conduit 6 back into the system through conduit 5.

The remainder of the melt in the melt section D is forced back through reflux zone C to form reflux which effects crystal purification, the resulting liquid being drawn off through outlet 38 together with the filtrate.

A pulsation producing section E comprises a driving rod 36 connected to a piston 37 through closure member 16. Piston 37 may be properly sealed with rings, etc., or by any conventional means to prevent leakage of the melt from the purification zone. Reciprocation of piston 37 may be produced by any conventional means, not shown.

As discussed in the patent of R. W. Thomas supra, convenient control means for the regulation of back pressure, cycle, temperature, etc. may be used.

Although the purification zone 13 is shown positioned horizontally, it can be operated in other positions. For example, it can be maintained in a vertical position with piston 37 at the top. This arrangement utilizes gravity as an aid to the flow of reflux. In addition, it may be desirable to use two or more of the purification zones in series to effect further purification of the saline solution.

It has been found that certain ranges of frequency of pulsation of the back pressure applied according to this invention produces results superior to certain other ranges of frequency. Improved results are obtainable at a frequency as low as 10 pulsations per minute or as high as 200 pulsations per minute, preferably 50 to 165 pulsations per minute. Highly superior results are obtained in the range from 125 to 150 pulsations per minute. Since the frequency of pulsation will depend on several factors including the hydrate forming substance used and the temperature and pressure within the purification zone and since these optimum conditions in any particular case can be readily determined by trial by those skilled in the art, it is to be understood that the configurations and frequencies stated herein are not necessarily optimum for every material used as a hydrate forming substance.

Although the back pressure within the purification zone is preferably applied by a piston or other periodic means, an irregular or nonperiodic increase in back pressure is within the scope of the invention. Such devices are well-known in the art and will include electrical, pneumatic or hydraulic actuation of the pulsating mechanism as well as purely mechanical actuation.

From the foregoing it will be seen that according to this invention, a pressure in the melting zone of the purification zone described is intermittently produced with pressure greater than that at the locus of the filtrate withdrawal. An intermittent reflux flow is thus created simultaneously with the locomotion of solids through the apparatus. This intermittent pulsation of the reflux flow purifies the countercurrently flowing hydrate crystals and removes the impurities contained therein while permitting the pure or substantially salt-free fresh water to be removed through conduit 25 as hereinabove described.

The following data is presented in illustration of a specific embodiment of the invention.

*Example*

Sea water containing approximately 3 weight percent NaCl is introduced into a scraped surface chiller (crystallizer) maintained at 53° F. and 400 p.s.i.g. along with a gaseous mixture of ethane and propane. The resultant hydrate crystals are conveyed into a purification column of the type described in Thomas, supra, maintained at substantially the same pressure as the aforementioned crystallizer. The purification column is operated in accordance with this invention to produce a slurry of hydrate crystals and fresh water which is then passed through a letdown valve to reduce the pressure to decompose the hydrate crystals therein. The resultant gas-liquid mixture is then passed to a flash tank maintained at substantially atmospheric pressure to flash off the ethane and propane which are recycled to the crystallizer. The condensed liquid is substantially salt-free water which is removed as product. The following tabulation is a material balance on the essential elements of the apparatus:

|  | Input to Crystallizer (8) | Input to Purification Column (12) | Output from Purification Column (25) | Output from Flash Tank (30) |
| --- | --- | --- | --- | --- |
| Salt water (1) | 2,000 | 1,000 | | |
| (Salt) | (60) | (60) | (60) | |
| Ethane (5) | 11 | | | 11 |
| Propane (5) | 132 | | | 132 |
| Hydrate crystals | | 1,143 | 643 | |
| Waste Brine (38) | | | 1,100 | |
| Fresh Water | | | 500 | 1,000 |

(All data in pounds per hour.)

Variation and modification within the scope of the disclosure and claims can readily be effected by those skilled in the art. While certain process steps, examples and structures have been described for purposes of illustration, it is clear that the invention is not limited thereto.

I claim:

1. A process for the production of substantially salt free water from aqueous salt solutions which comprises contacting a hydrate forming material with an aqueous salt solution under conditions suitable for the formation of hydrates to form hydrates, decomposing a portion of said hydrates to form a melt comprising water and said hydrate forming material, contacting at least a portion of said melt intermittently and countercurrently with said hydrates and forming hydrate crystals of increased purity thereby removing impurities therefrom, removing melt and decomposing said hydrate crystals to yield a substantially salt free water product.

2. The process of claim 1 wherein said portion of said melt is contacted intermittently and countercurrently with said hydrates by directly applying a pulsating pressure substantially only against said melt to establish a pulsating reflux stream.

3. A process for the production of substantially salt free water from sea water which comprises contacting sea water in a hydrate forming zone with a hydrate forming material selected from the group consisting of paraffin hydrocarbons having from 1 to 4 carbon atoms per molecule under hydrate forming conditions of temperature and pressure to form hydrate crystals in a diluent comprising saline water, removing said crystals from said hydrate forming zone to a purification zone maintained at substantially the same pressure as said hydrate forming zone, separating said diluent from said hydrate crystals, decomposing a portion of said crystals by elevating the temperature thereof to above the decomposition point of said crystals to form a melt comprising water, hydrate forming material and hydrate crystals, conveying at least a portion of said melt intermittently and countercurrently to the flow of the crystals by directly applying a pulsating pressure substantially only against said melt to establish a pulsating reflux stream within said purification zone and forming hydrate crystals of increased purity thereby removing impurities from said crystals, removing from said purification zone a slurry comprising hydrate crystals and substantially salt free water, decomposing said crystals to form a mixture comprising hydrate forming material and water and separating said hydrate forming material to yield a substantially salt free water product.

4. The process of claim 3 wherein said hydrate forming material is selected from the group consisting of propane, propane and ethane, and propane and methane.

5. A process for the production of substantially salt free water from sea water which comprises contacting from about 10 to 95 weight percent sea water in a hydrate forming zone with about 5 to 90 weight percent of a hydrate forming material selected from the group consisting of paraffin hydrocarbons having from 1 to 4 carbon atoms per molecule at a temperature in the range between about 32° F. and 100° F. and a pressure in the range between about 10 and 5,000 p.s.i.g. to form hydrate crystals in a diluent comprising saline water, removing said crystals from said hydrate forming zone to a purification zone maintained at substantially the same pressure as said hydrate forming zone, separating said diluent from said hydrate crystals, decomposing a portion of said crystals by elevating the temperature thereof to above the decomposition point of said crystals to form a melt comprising water, hydrate forming material and hydrate crystals, conveying at least a portion of said melt intermittently and countercurrently to the flow of the crystals by directly applying a pulsating pressure substantially only against said melt to establish a pulsating reflux stream within said purification zone and forming hydrate crystals of increased purity thereby removing impurities from said crystals, removing from said purification zone a slurry comprising hydrate crystals and substantially salt free water, decomposing said crystals to form a mixture comprising said hydrate forming material and water and separating said hydrate forming material to yield a substantially salt free water product.

6. The process of claim 5 wherein said hydrate forming material is selected from the group consisting of propane, propane and ethane, and propane and methane.

7. A process of claim 5 wherein said hydrate forming material is propane; said hydrate forming zone temperature is between 30 and 43° F.; and said hydrate forming zone pressure is between 50 and 400 p.s.i.g.

8. A process for the production of substantially salt free water from sea water which comprises contacting about 10 to 95 weight percent sea water in a hydrate forming zone with about 5 to about 90 weight percent hydrate forming material comprising 5 to 25 mole percent ethane and 75 to 95 mole percent propane at a temperature of 40 to 55° F. and a pressure in the range of about 375° to 425° p.s.i.g. to form hydrate crystals in a diluent comprising saline water, removing said crystals from said hydrate forming zone to a purification zone maintained at substantially the same pressure as said hydrate forming zone, separating said diluent from said crystals, decomposing a portion of said crystals by elevating the temperature thereof to above the decomposition point of said crystals to form a melt comprising water, hydrate forming material and crystals, conveying at least a portion of said melt intermittently and countercurrently with the flow of the crystals by directly applying a pulsating pressure substantially only against said melt to establish a pulsating stream within said purification zone and forming hydrate crystals of increased purity thereby removing impurities from said crystals, removing from said purification zone a slurry comprising hydrate crystals and substantially salt free water, decomposing said crystals by the reduction of pressure to form a gas-liquid mixture comprising hydrate forming material and substantially salt free water, separating said hydrate forming material and recycling to said hydrate forming zone and recovering a substantially salt free water product.

References Cited in the file of this patent

UNITED STATES PATENTS

| 2,854,494 | Thomas | Sept. 30, 1958 |
| 2,904,511 | Donath | Sept. 15, 1959 |
| 2,974,102 | Williams | Mar. 7, 1961 |

UNITED STATES PATENT OFFICE
CERTIFICATE OF CORRECTION

Patent No. 3,119,771                        January 28, 1964

John E. Cottle

It is hereby certified that error appears in the above numbered patent requiring correction and that the said Letters Patent should read as corrected below.

Column 3, line 74, after "water" insert -- , propane --; column 5, line 67, after "crystals" insert -- , propane --; column 7, line 36, for "hydrates to form hydrates" read -- hydrate crystals --; line 37, for "hydrates" read -- hydrate crystals --; column 8, line 47, for "375° to 425°" read -- 375 to 425 --; line 59, after "pulsating" insert -- reflux --.

Signed and sealed this 7th day of July 1964.

(SEAL)
Attest:

ERNEST W. SWIDER                         EDWARD J. BRENNER
Attesting Officer                             Commissioner of Patents